Nov. 16, 1965    J. D. HOWARD    3,217,444
LIVE BAIT STORING DEVICE
Filed Oct. 17, 1962    2 Sheets-Sheet 1
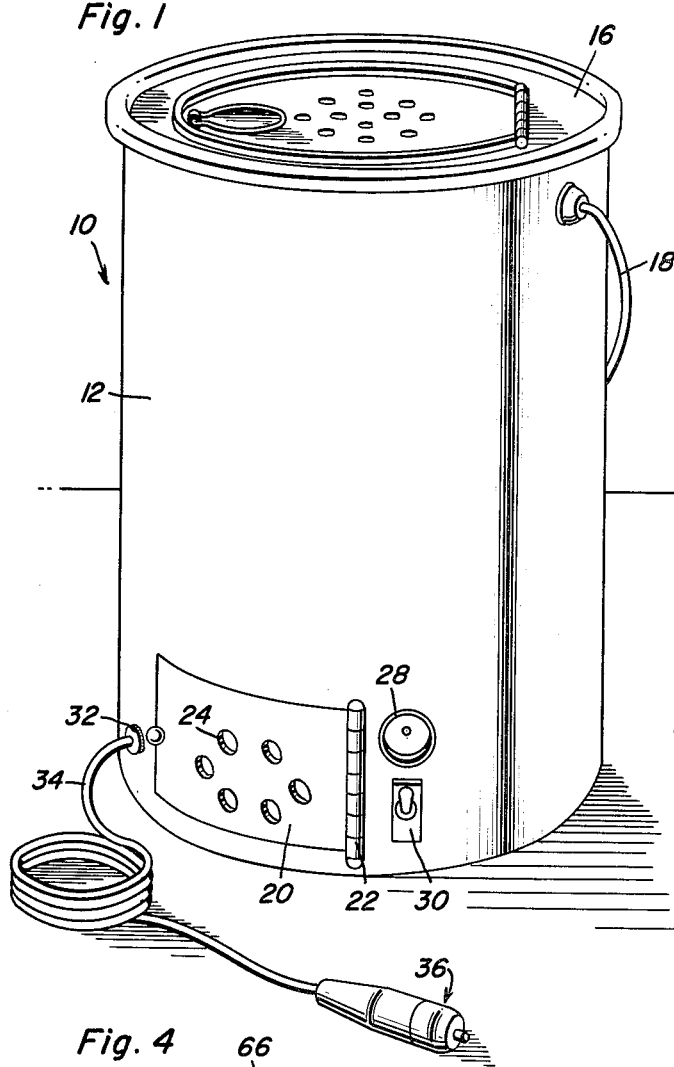
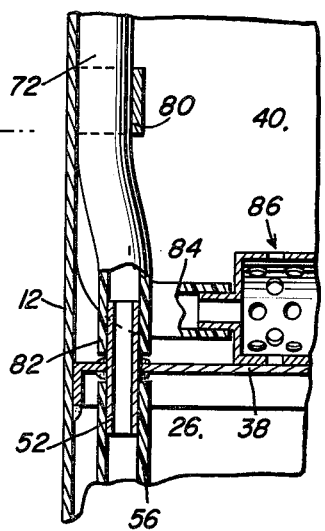
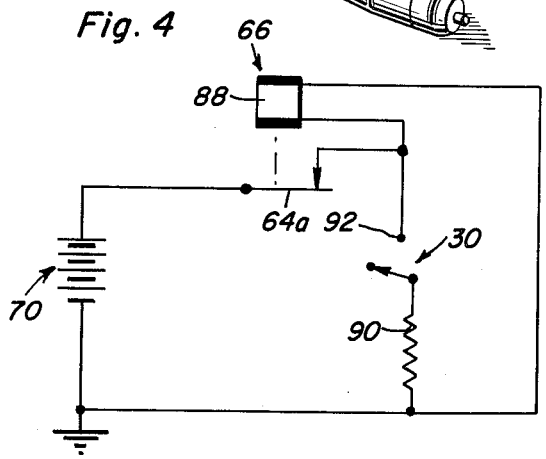
Jeral Deane Howard
INVENTOR.

Nov. 16, 1965  J. D. HOWARD  3,217,444
LIVE BAIT STORING DEVICE
Filed Oct. 17, 1962  2 Sheets-Sheet 2

Jeral Deane Howard
INVENTOR.

United States Patent Office 3,217,444
Patented Nov. 16, 1965

3,217,444
LIVE BAIT STORING DEVICE
Jeral Deane Howard, North Little Rock, Ark., assignor of thirty percent to Carold Huggins and five percent to Carl H. Graham, both of North Little Rock, Ark., and twenty percent to Gene Worsham, Little Rock, Ark.
Filed Oct. 17, 1962, Ser. No. 231,133
6 Claims. (Cl. 43—57)

This invention relates to a device within which live bait such as minnows may be stored and maintained in a healthy condition and more particularly to a portable minnow bucket-type of device.

An important object of the present invention is to provide a portable bucket device for storing and maintaining in a healthy condition, live bait for fishing and other purposes having a water aerating system capable of being powered by a self-contained battery source of power or from a power source external thereto.

In accordance with the foregoing object, the minnow bucket device of the present invention features a false bottom section below a liquid-tight chamber within which the live bait is maintained in water, the false bottom section mounting there within a battery source of power and a power operated air pump discharging air under pressure into the water supported thereabove in order to maintain the live bait or minnows in a healthy condition within the water.

An additional object of the present invention is to provide an aerating system for minnow buckets which may be powered either from an internal source of power or from an external source of power such as the battery of an automotive vehicle, the bucket device being accordingly provided with a selector switch for conditioning the aerating system for operation from either the internal source of power or the external source of power.

A still further feature of the present invention in accordance with the foregoing objects, is to provide a minnow storing bucket device having a false bottom member or partition forming a liquid-tight chamber above a bottom section, the false bottom member being provided with a connector tube through which fluid communication is established between the discharge of an air pump within the lower section and an air distributing conduit which extends vertically through the fluid-tight chamber so as to form a passage which rises above the level of the water within the water-tight chamber in order to avoid the syphoning of water therethrough.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the live bait storing device of the present invention.

FIGURE 3 is an enlarged partial sectional view taken substantially through a plane indicated by section line 3—3 in FIGURE 2.

FIGURE 4 is a circuit diagram of the power control system associated with the live bait storing device.

Figure 2:
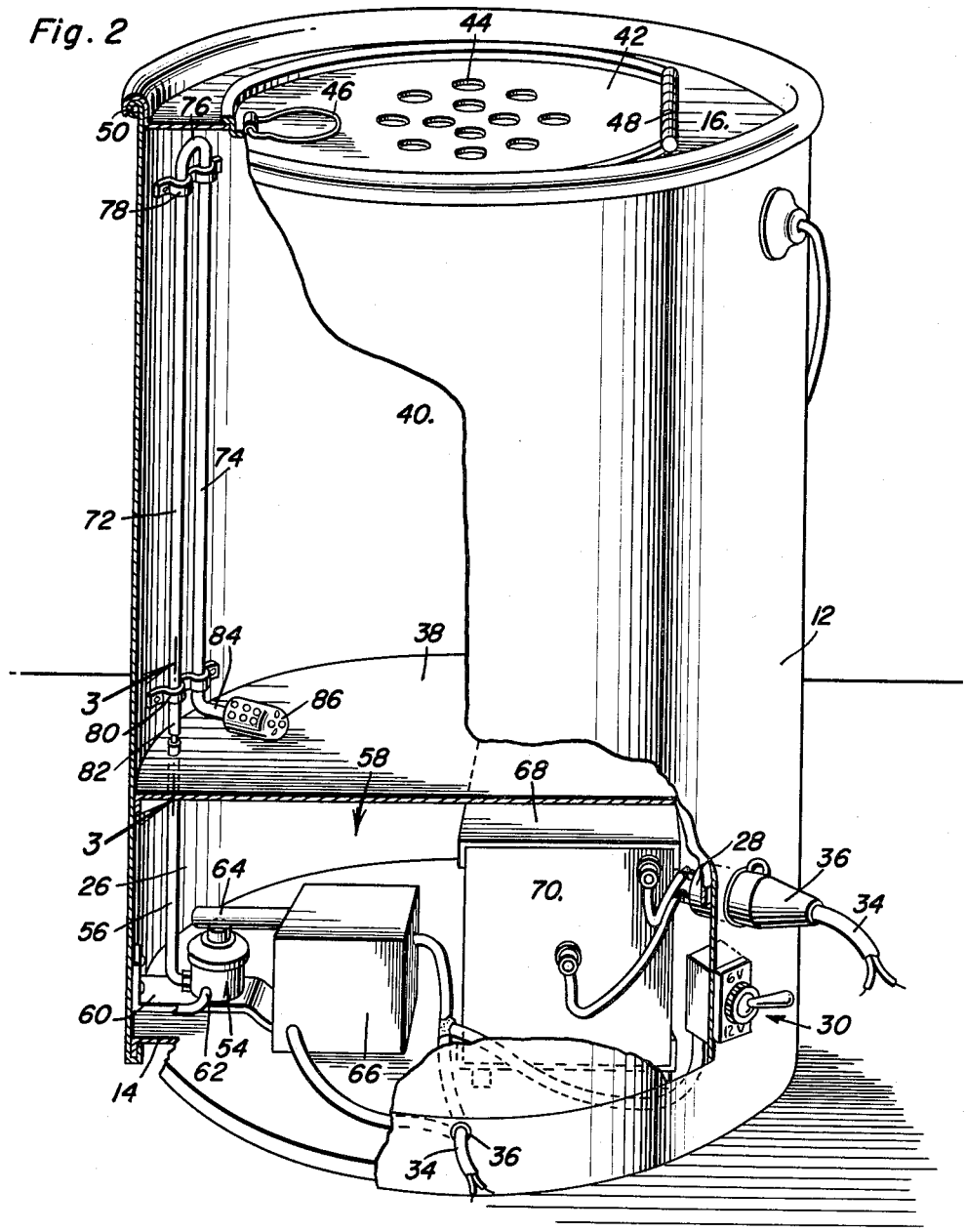
FIGURE 2 is an enlarged perspective view with parts broken away of the live bait storing device.

Referring now to the drawings in detail, it will be observed that the live bait storing device is generally referred to by reference numeral 10 and is generally formed in the shape of a bucket having a vertical cylindrical wall 12. It will of course be appreciated, that other shapes may be adopted without departing from the basic principles of the present invention. The cylindrical wall 12, is closed at the bottom by means of a bottom member 14 secured thereto in any suitable manner while the top end of the cylindrical member 12 is sealed by a top lid member 16. A handle bail 18 is pivotally connected to the member 12 adjacent the upper end thereof for carrying purposes. An opening is formed adjacent the bottom portion of the cylindrical member 12 which is closed by an access door 20 secured to the member 12 by the hinge assembly 22, the access door 20 being provided with a plurality of vent holes 24 through which air is admitted to a lower false bottom section 26 of the device 10 forming a protective housing for equipment mounted therein. Mounted adjacent to the hinge assembly on the cylindrical member 12, is a socket receptacle 28 of the electrical connector type usually provided on the dashboard of an automotive vehicle in connection with a cigarette or cigar lighter. Also mounted on the cylindrical member 12 just below the socket receptacle 28, is a power selector switch assembly generally referred to by reference numeral 30 serving a purpose to be hereafter explained. Mounted within the cylindrical member 12 adjacent to the access door 20 on the side opposite the hinge assembly 22, is an insulating grommet 32 through which a power cable 34 extends, said power cable being connected at the end thereof to a power plug connector device 36 adapted to be received within the socket receptacle 28 or the socket receptacle of the cigarette lighter mounted on the dashboard of an automotive vehicle for the purpose of establishing electrical connections to a source of electrical energy.

Referring now to FIGURE 2 in particular, it will be observed that the lower false bottom section 26 is formed between the bottom wall member 14 and an intermediate partition member 38 secured to the walls of the cylindrical member 12 in any suitable manner such as by welding so as to define thereabove, a liquid-tight chamber 40 within the upper section of the device. The liquid-tight chamber is thus defined between the partition member 38 and the lid 16. The lid 16 is therefore provided with a live bait access door 42 provided with a plurality of vent holes 44 and with a lift ring 46 pivotally connected to the door diametrically opposite to a pin type hinge 48 which pivotally connects the door 42 to the lid member 16. The lid member 16 is preferably removably mounted on the upper rim portion 50 of the cylindrical member 12 so that the chamber 40 may be periodically emptied and cleaned. Although the liquid-tight chamber 40 excludes liquid from the bottom section 26, fluid communication is established therebetween by means of a relatively rigid connector tube 52 that extends through an aperture in the partition member 38 and is welded thereto as more clearly seen in FIGURE 3. The lower end of the connector tube 52 projecting into the lower section 26 is therefore connected to the discharge of a diaphragm type of air pump 54 by means of the flexible tube 56. The air pump 54 constitutes part of an aerator assembly 58 located within the lower section 26 and mounted by means of the mounting bracket 60 secured to the cylindrical wall of the lower section. The air pump device 54 is therefore provided with an intake 62 and is actuated by a striker arm 64 which projects out of a relay switch and circuit assembly 66 mounted on the mounting bracket 60 in a vibrationless manner. The assembly 66 therefore constitutes an electrically powered vibrator for imparting a vibratory stroke to the striker member 64 in order to actuate the air pump 54. The assembly 66 is therefore provided with electrical conductors that extend therefrom so as to form the power cable 34 which extends out of the bucket through the grommet 36. Also electrically connected by conductors to the assembly 66, is the power selector switch 30 which is mounted on the lower section of the cylindrical wall 12. Also mounted by suitable supports 68 within the lower section, is a 6-volt dry cell battery 70 to which conductive leads welded to the socket receptacle 28, are connected. In this manner, power may be supplied from the battery 70 through the power cable 34 to the electrically powered vibrator assembly 66 in order to operate the pump 54 discharging air under pressure into the flexible hose 56.

Air under pressure from the discharge hose 56, is conducted through an elongated flexible conduit within the chamber 40, the elongated conduit including a pair of parallel sections 72 and 74 interconnected at the upper end adjacent the rim portion 50 by a U-turn section 76. The elongated flexible conduit is fixedly mounted in its vertically extended arrangement within the chamber 40 by means of a pair of brackets 78 and 80 so that air discharged from the pump will be conducted from the inlet end 82 at the partition member 38 upwardly around the U-turn section 76 adjacent the lid member 16 and then downwardly to the outlet portion 84 again adjacent to the partition member 38. Connected to the outlet portion 84 of the flexible conduit, is a diffuser head 86 by means of which air is distributed and discharged in the form of bubbles of reduced size into the liquid contained within the chamber 40. It will be furthermore noted, that in view of the air passage formed by the conduit sections 72 and 74 and 76, extending above the level of the water within the chamber 40, syphoning of water through the flexible conduit is prevented.

Referring now to FIGURE 4, it will be observed that the vibrator 66 includes an electromagnetic coil 88 which when energized will open a normally closed switch section 64a connected to the pump actuating arm 64. Thus, a power circuit may normally be closed through the switch 64a and the coil 88 across the battery source of power 70 when the power cable 34 and the power plug 36 connected thereto is plugged into the receptacle 28. Energization of the electromagnetic coil 88 will therefore open the switch section 64a so as to interrupt the power circuit whereupon the coil becomes de-energized causing the switch 64a to close once again in order to re-establish the power circuit. In this manner, a vibrating action is imparted to the switch section 64a in order to cause the actuating arm 64 to actuate the pump 54. When the vibrator 66 is being electrically powered by the 6-volt battery 70, the selector switch 30 will be in the position illustrated in FIGURE 4 with the power reducing resistor 90 cut out of the circuit inasmuch as the 6-volt battery source 70 is designed to establish the proper energizing current for the electromagnetic coil 88. When, however, the power plug 36 is connected to a higher external voltage source as for example the 12-volt battery of an automotive vehicle, the selector switch 30 may be moved to the 12-volt position engaging the fixed contact 92 so as to establish parallel circuits through the electromagnetic coil 88 and the resistor 90. Accordingly, the current that would be established by the external 12-volt battery source would be reduced to the operating level associated with the internal battery source 70. In this manner, the aerating assembly 58 may be conditioned for operation either from the self-contained battery source or from an external source of a higher potential. The power plug device 36 connected to the power cable 34 is therefore adapted to be inserted within the cigarette lighter normally mounted on an automotive vehicle dashboard for which reason the same type of socket receptacle 28 is mounted within the wall of the bucket.

From the foregoing description, the operation and utility of the live bait storing device of the present invention will be apparent. It will therefore be appreciated, that the live bait storing device is particularly useful because of its portability inasmuch as it does not depend upon a fixed source of electrical power and yet mounts an electrically powered aerating system within a lower false bottom section for both convenient mounting and protective disposal thereof and to provide a bucket device of greater stability as compared to devices which mount aerating systems on top or on the sides of the storing bucket. Also, the convenience of utilizing either a self-contained source of power or one derived from an automotive vehicle, will be obvious.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A live bait storing device comprising, bucket means having an upper storing section containing liquid and a lower vented section, partition means mounted within said bucket means for separating said sections to define a liquid-tight chamber within said upper section, aerating means including power operated pump means enclosed within said lower section and air distributing means connected to said pump means and extending through said partition means to conduct air under pressure vertically above the level of liquid within said fluid-tight chamber for discharge adjacent said partition means at the bottom of the liquid-tight chamber, whereby flow of liquid from the upper section into the air distributing means is prevented, said air distributing means comprising a connector tube fixed to said partition means for establishing fluid communication between said upper and lower sections, a flexible conduit connecting said connector tube to the pump means, elongated conduit means fixedly mounted within said fluid-tight chamber for conducting a flow of air through the liquid, said elongated conduit means including an inlet end connected to said connector tube for excluding liquid therefrom and an outlet end disposed adjacent the partition means, and a diffuser head connected to said outlet end for distributed discharge of air into the liquid in reduced size bubble form, said aerating means further including an electrically powered vibrator mounted within the lower section and having an actuating arm engageable with a pump means for operation thereof and power cable means connected to the vibrator and extending out of the bucket means for supply of electrical energy to the vibrator from an external source of energy, an internal source of power mounted within the lower section, receptacle means mounted on the bucket means and connected to said internal source, a power plug connected to said power cable means and adapted to be received in said receptacle means for electrically connecting the vibrator to the internal source, current reducing resistor means, and power selector means mounted on said bucket means and operatively connecting the resistor means to the power cable means for reducing the power supplied to the vibrator to the level of the internal source of power whereby energy conducted by said power cable means may be derived internally or externally of the bucket means.

2. A live bait storing device comprising bucket means having an upper storing section containing liquid and a lower vented section, partition means mounted within said bucket means for separating said sections to define a liquid-tight chamber within said upper section, aerating means including power operated pump means enclosed within said lower section and air distributing means connected to said pump means and extending through said partition means to conduct air under pressure vertically above the level of liquid within said fluid-tight chamber for discharge adjacent said partition means at the bottom of the liquid-tight chamber, whereby flow of the liquid from the upper section into the air distributing means is prevented, said aerating means further including an electrically powered vibrator mounted within the lower section and having an actuating arm engageable with the pump means for operation thereof and power cable means connected to the vibrator and extending out of the bucket means for supply of electrical energy to the vibrator, an internal source of power mounted within the lower section, and receptacle means mounted on the bucket means and connected to said internal source, and a power plug connected to said power cable means and adapted to be received in said receptacle means for electrically connecting the vibrator to the internal source.

3. A live bait storing device comprising bucket means having a lid, an upper storing section containing liquid and a vented lower section, partition means mounted within said bucket means for separating said sections to define a liquid-tight chamber within said upper section below said lid, aerating means including power operated pump means enclosed within said lower section and air distributing means connected to said pump means and extending through said partition means to conduct air under pressure vertically above the level of liquid within said fluid-tight chamber for discharge adjacent said partition means at the bottom of the liquid-tight chamber, power cable means connected to the aerating means extending out of the bucket means for conducting a supply of electrical energy, an internal source of power mounted within the lower section, receptacle means mounted on the bucket means and connected to said internal source, a power plug connected to said power cable means for insertion into said receptacle means to electrically connect the pump means to the internal source, current reducing resistor means, and power selector means mounted on said bucket means and operatively connecting the resistor means to the power cable means for reducing the power supplied to the pump means to the level of the internal source of power whereby energy conducted by said power cable means may be derived externally of the bucket means from a higher voltage source.

4. The combination of claim 3 including vented access means mounted respectively on the upper lid and lower section of the bucket means through which live bait may be transferred to and from the liquid-tight chamber and repairs made to the aerating means within the lower section.

5. In a portable live bait bucket device having a vented housing section mounting electrically powered pump means, an electrical power cable connected to said electrically powered pump means extending out of the housing section through an opening therein, a connector device connected to said cable externally of the bucket device, connector means mounted by the housing section for receiving the connector device to complete an energizing circuit for the pump means, a battery mounted within the housing section and connected to the connector means for supplying said energizing circuit with electrical energy when completed through the connector means, resistor means mounted within the housing section and connected to the battery for reducing current in the energizing circuit when supplied by an external power supply, and power selecting switch means connected to said resistor means for removing the resistor means from the energizing circuit when supplied by the battery, whereby the cable may conduct energizing current from either the external power supply or the battery.

6. A live bait bucket comprising, a container body having a liquid storing compartment and a vented compartment, a liquid tight partition separating said compartments, power operated aerating means mounted in said vented compartment and extending through said partition for supplying air under pressure to liquid within the storing compartment, an internal voltage source mounted within the vented compartment, a power cable connected to the power operated aerating means extending externally of the container body for conducting energizing current to the aerating means, connector means mounted on the container body and connected to said internal voltage source for selective connection thereof to the power cable to energize the aerating means, said power cable also being selectively connectable to an external source of higher voltage than said internal source of voltage, and voltage selecting means mounted on the container body and connected to the aerating means for reducing the flow of current from said power cable when connected to said external source of higher voltage.

References Cited by the Examiner
UNITED STATES PATENTS

| | | | |
|---|---|---|---|
| 299,765 | 6/1884 | Evans | 43—57 |
| 1,616,125 | 2/1927 | Holman | 119—5 |
| 1,852,267 | 4/1932 | Roush. | |
| 2,550,533 | 4/1951 | Clark | 43—57 |
| 2,673,938 | 3/1954 | Winkelman. | |
| 2,806,432 | 9/1957 | Brooks | 103—53 |
| 2,919,120 | 12/1959 | Baxter | 43—57 |

ABRAHAM G. STONE, *Primary Examiner.*